United States Patent [19]

Hanna

[11] 4,351,098

[45] Sep. 28, 1982

[54] METHOD FOR REPAIRING AND REINFORCING CAST IRON MOLDS

[76] Inventor: Glenn W. Hanna, 1441 Wightman St., Pittsburgh, Pa. 15217

[21] Appl. No.: 158,409

[22] Filed: Jun. 11, 1980

[51] Int. Cl.³ ............................................. B23P 6/00
[52] U.S. Cl. ............................. 29/402.15; 29/402.09; 29/402.13; 29/402.16; 164/DIG. 6; 164/411; 164/341; 249/174; 249/205; 249/219 R
[58] Field of Search .......... 29/402.01, 402.09, 402.12, 29/402.13, 402.14, 402.15, 402.16; 164/DIG. 6, 341, 394, 395, 412, 411; 249/139, 204, 205, 219 R, 219 W, 174, 173

[56] References Cited

U.S. PATENT DOCUMENTS

| | | | |
|---|---|---|---|
| 985,771 | 3/1911 | Becker | 164/395 |
| 1,065,921 | 7/1913 | Cubley | 164/412 |
| 1,512,018 | 10/1924 | Frazer | 164/394 |
| 2,712,326 | 7/1955 | Yurdin | 29/402.09 |
| 3,808,667 | 5/1974 | Evertz et al. | 29/402.14 |

FOREIGN PATENT DOCUMENTS

| | | | |
|---|---|---|---|
| 591081 | 4/1925 | France | 164/395 |
| 1311987 | 11/1962 | France | 29/402.09 |
| 93523 | 11/1938 | Sweden | 29/402.12 |

Primary Examiner—Francis S. Husar
Assistant Examiner—V. K. Rising
Attorney, Agent, or Firm—Keil & Witherspoon

[57] ABSTRACT

This invention relates to a method for reinforcing and repairing cast iron molds by surrounding the mold with a closely fitted steel plate or plates, connecting the ends of the steel plate or plates to form a continuous band, attaching the continuous band to the cast iron mold and locating spacers between the cast iron mold and the continuous band to elevate the band from the cast iron mold wall surface. This invention further relates to a method for reducing shear stress on the means by which the continuous band is attached to the mold by locating the means of attachment around a corner from the source of stress at an obtuse angle to the mold wall being reinforced.

10 Claims, 2 Drawing Figures

METHOD FOR REPAIRING AND REINFORCING CAST IRON MOLDS

This invention concerns a method for repairing and reinforcing cast iron molds, particularly steel works ingot molds, using continuous steel bands in which cracks in the mold wall are prevented from opening or enlarging by the elastic properties of the steel band. These elastic properties, the tensile strength of the band, are preserved by reducing heat conduction from the surface of the mold to the steel band by use of spacers between the mold and the steel band.

Cast iron molds are subjected to extreme stresses due to thermal shock and moments created on the iron walls due to uneven expansion as a result of uneven heating. The temperature difference between the inside and outside of the mold can be as much as 2000° F. The resulting stress if frequently relieved by the cracking of the iron wall. Since cast iron is a material which can sustain very high forces in compression but very low forces in tension, the cracks appearing in the mold walls have a tendency to spread through repeated use. A means for counteracting the tendency of the cracks to spread is by bridging the cracks with a steel plate that is anchored to the mold wall, thus the forces that act to spread the crack are absorbed by the steel plate. The steel plate applied in such a way provides a ductile material that can resist tension and thus hold the crack together. It is known that an extended usable life of an ingot mold can be obtained when it is repaired in such a way.

A further known means of extending the usable life of ingot molds is to provide them with steel bands that completely surround the mold and are fitted tightly to the circumference of the ingot molds and anchored at prescribed points to the ingot mold wall. A known method involves conforming the steel plates exactly to the outside surface of the ingot mold wall and providing the band with a plurality of fastenings along its entire circumference. This means of placing the steel band in direct contact with the iron mold wall has some serious disadvantages.

The primary disadvantage of placing the steel plate in contact with the iron mold wall is that thermal conduction from the iron mold wall to the steel plate is maximized. Increased temperatures of the steel plates result in a lowering of their stress values, which increase the liklihood of plastic distortion of the steel plate. This diminishes the effects of the steel plates whose sole purpose is to provide the iron mold with the ductility that the iron lacks.

An additional disadvantage of conforming the steel plate to the outside surface of the iron mold wall is that excess plate must be provided for indentations in the mold wall. The mold is then provided room for expansion as a result of the excess lengths of steel plate.

It is the object of the present invention to provide a reinforcement and repair method that will minimize heat transfer from the iron mold to the steel plates and also to provide a means for maximizing the effects of the plate by eliminating excess lengths that allow the mold to expand unhindered.

This object is obtained by the present invention through the use of spacer plates which are located between the outside surface of the iron mold wall and the steel band at prescribed locations. These spacer plates enable the steel band to be applied in such a way that it is elevated from the surface of the iron mold wall. This results in an insulating air space between the iron mold wall and the steel band, so that the heat transfer to the steel band as a result of conduction is minimized.

By elevating the steel band from the iron mold wall the secondary advantage of bridging imperfections on the surface of the iron mold wall is achieved. Thus, no excessive counterproductive length of steel plate is added to the band.

Anchoring of the steel plate to the iron mold wall is accomplished according to prescribed means, and spacer plates are then placed so as not to interfere with the anchors.

The spacer plates so applied may be of ay reasonable dimension and different plates on the same mold may vary in dimension according to necessity. Positioning of the spacer plates also may be flexible, so that optimum advantage may be gained by arranging the location of the spacer plates to best suit the surface characteristics of any particular ingot mold.

The steel band can be composed of several overlapping steel plates, joined at their overlapping or abutting ends, or a single steel plate joined at its ends; the purpose being to create a continuous band.

There are many possible means of attaching the spacer plates and many materials out of which the spacers may be fabricated. The most readily available material in steel mills is scrap steel and so a logical choice is steel, however beneficial use could also be made of other metals with lower thermal conductivity properties. There also is the possibility of including a type of fabric insulation to the spacers, or a refractory material that could absorb high compression.

Means for attaching the plates in such a way as to affix them in their position are equally numerous and are covered by the present invention. Some possibilities are nails, welds, bolts, rivets or other conventional fastening procedures that would affix the plate directly to the mold. The same procedures could be used to fasten the spacers to the band itself. An additional method is the provision of a surface irregularity at the top of the spacer that would hold the plate in place by friction. Gravity could also be used in conjunction with a catch or lip at the top of the spacer that would catch the band. Spacers formed in the shape of a wedge and hammered in behind the plate are also a possibility, as is a wedge hammered between the spacer and the band on the mold.

An additional method of providing spacers is to form protuberances in the wall of the mold itself when it is originally cast. The steel band could then be attached to the mold over the protuberances.

The strength of the mechanism by which the steel band is attached to the cast iron mold plays a large part in the effectiveness of the reinforcement. The anchoring mechanism should be capable of transferring 100% of the force which acts to crack the mold and spread the cracks from the mold to the steel plates. Therefore, the success or failure of the reinforcement to a large degree lies in the strength of the highly stressed anchors. A means of maximizing the effectiveness of the anchors is to place them at obtuse angles to the forces at work in the mold. According to the trigonometric formula, $H = 0/\sin \phi$ wherein H is the hypotenuse and 0 is the opposite side and $\sin \phi$ is the sin of the opposite angle, a shear value for the anchors can be determined provided a pure shear pressure for the stud at 90° is known.

For instance, a stud that is rated at 36,000 lbs. of shear pressure at a 90° angle to the force exerted on it will develop 50,911,688 lbs. of shear resistance if it is situated at an angle of 45° to the force by the formula $H = O/\sin \phi$ where $H = (36,000)/(0.707106) = H = 50,911.688$. In like manner the same stud placed at 80° to the force will provide 207,315.74 lbs. of shear resistance by the same formula. Therefore, by locating the anchors, as shown in FIG. 2, on the corners of the mold, the shear force on the anchors is lessened. The anchors themselves can be bolts, studs or nails which are in common use in the industry.

A plurality of anchors can be used at each corner and located around the radius of the mold corner to more securely attach the steel belt to the mold and distribute the shear force among several anchors.

The spacer plates as designed are made of low carbon steel however it will be obvious to those skilled in the art that many modifications may be made within the scope of the present invention without departing from the spirit thereof, and the invention includes all such modifications.

Explanation will herinafter be made with reference to the accompanying drawings.

Figure 1:
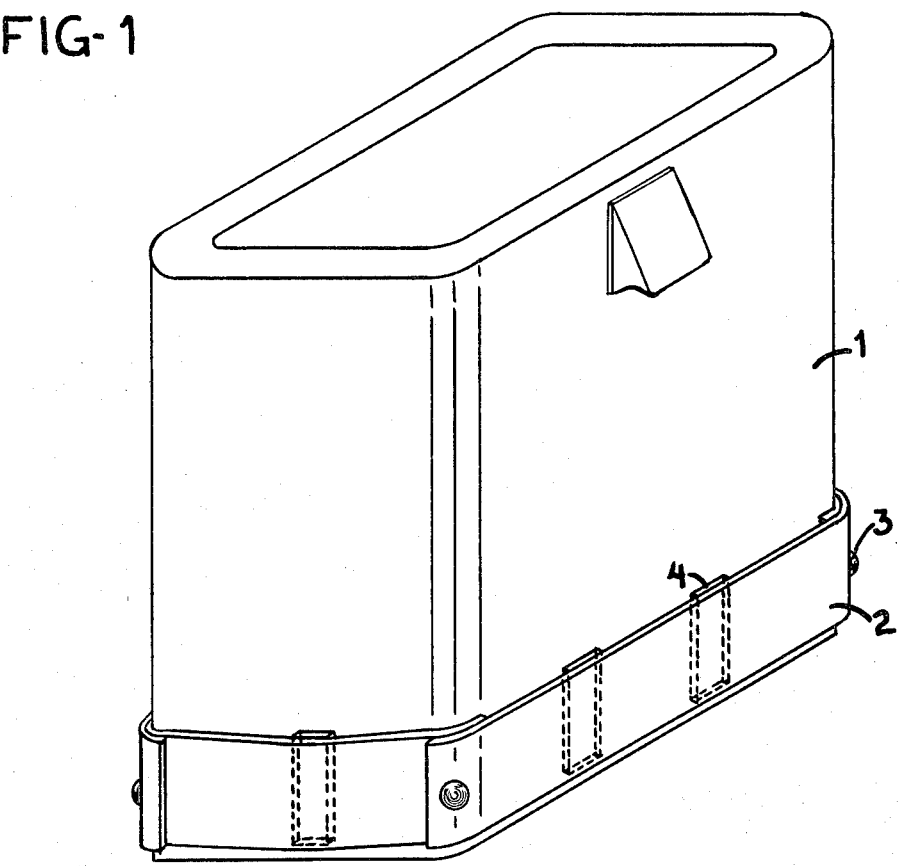
FIG. 1 is a perspective view of an ingot mold with spacer plates and steel band in place.
Figure 2:
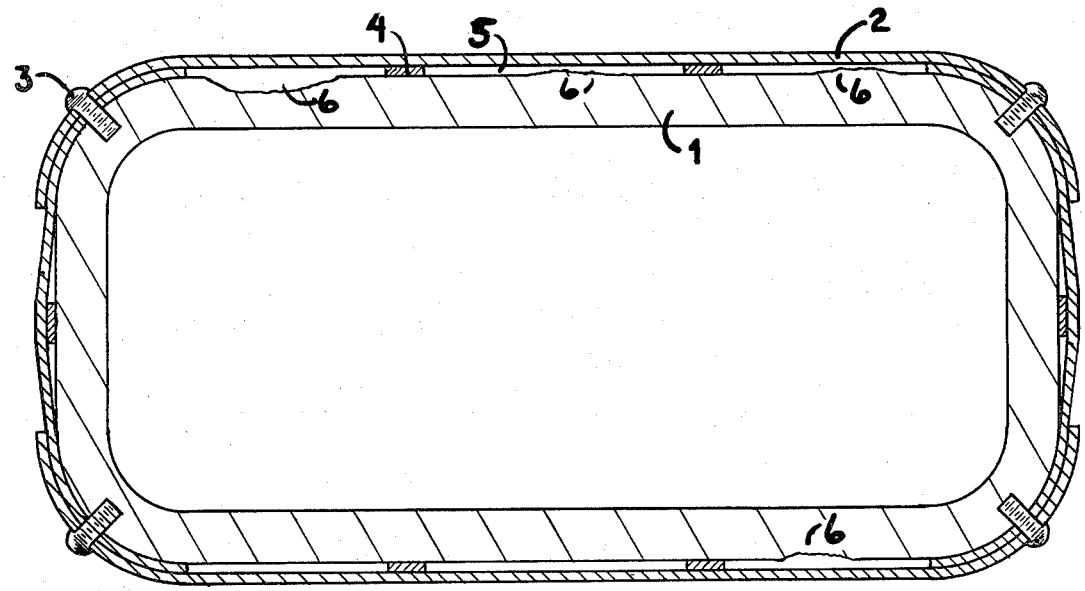
FIG. 2 is a horizontal cross section of the ingot mold in FIG. 1 through the horizontal center line of the anchors.

In FIG. 1 an ingot mold (1) is shown with a steel ban (2) in place. Anchors (3) are placed on the corners. The steel band (2) is held apart from the surface of the ingot mold walls by spacer plates (4). As is apparent from FIG. 2, imperfections in the ingot mold's external surface (6) are bridged by the band and so have no detrimental effects.

What is claimed is:

1. A method for reinforcing and repairing cast iron molds, wherein a continuous band is used which is elevated from the mold wall by spacers to reduce heat conduction, which comprises:
   (a) surrounding the mold with at least one closely fitted steel plate;
   (b) connecting the ends of the steel plate or plates to form a continuous band;
   (c) attaching the continuous band to the cast iron mold;
   (d) locating a plurality of spacers on each face of the mold between the cast iron mold and the continuous band so as to elevate the band from the cast iron mold wall, limiting the transfer of heat to said band when the mold is heated, thereby preventing the plastic deformation of the band.

2. A method for reinforcing and repairing cast iron molds as recited in claim 1 wherein the spacers are inserted between the closely fitted steel plate and the cast iron mold before connecting the ends of the steel plate to form a continuous band.

3. A method for reinforcing and repairing cast iron molds as recited in claim 1 wherein the spacers are attached to the steel plate or plates before surrounding the mold with the steel plate or plates.

4. A method for reinforcing and repairing cast iron molds as recited in claim 1 wherein the spacers are inserted between the cast iron mold and the continuous band after attaching the continuous band to the cast iron mold.

5. A method for reinforcing and repairing cast iron molds as recited in claim 1 wherein the spacers are attached to the cast iron mold before surrounding the mold with at least one closely fitted steel plate.

6. A method for reinforcing and repairing cast iron molds as recited in claim 1 wherein the spacers are located on the cast iron mold being cast as protuberances in the mold wall during the original casting.

7. A method for reinforcing and repairing cast iron molds as recited in claim 1 wherein the method of connecting the ends of the steel plate or plates comprises welding.

8. A method for reinforcing and repairing cast iron molds as recited in claim 1 wherein the method of connecting the ends of the steel plate or plates comprises bolting.

9. A method for reinforcing and repairing cast iron molds as recited in claim 1 wherein the method of connecting the ends of the steel plate or plates comprises riveting.

10. A method for reinforcing and repairing cast iron molds as recited in claim 1 which comprises anchoring the band using anchoring means located around the corner from and at an obtuse angle to the surface of the mold which is being reinforced or repaired.

* * * * *